(No Model.)
A. J. PARKHURST.
WHIFFLETREE.
No. 428,730. Patented May 27, 1890.
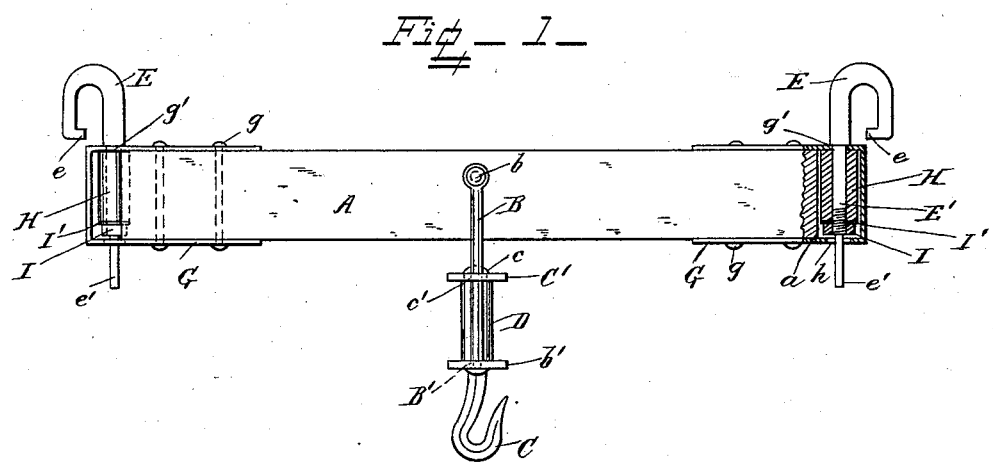
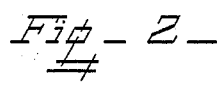
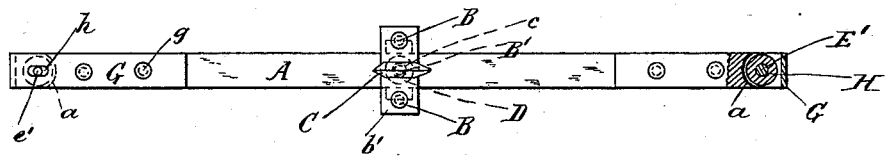
WITNESSES
A. W. Bright.
Jas. K. McCathran
INVENTOR
A. J. Parkhurst.
by Herbert W. T. Jenner.
Attorney

UNITED STATES PATENT OFFICE.

ALBERT J. PARKHURST, OF KENT CITY, MICHIGAN.

WHIFFLETREE.

SPECIFICATION forming part of Letters Patent No. 428,730, dated May 27, 1890.

Application filed November 8, 1889. Serial No. 329,651. (No model.)

*To all whom it may concern:*

Be it known that I, ALBERT J. PARKHURST, a citizen of the United States, residing at Kent City, in the county of Kent and State of Michigan, have invented certain new and useful Improvements in Whiffletrees; and I do hereby declare the following to be a full, clear, and exact description of the invention, such as will enable others skilled in the art to which it appertains to make and use the same.

This invention relates to whiffletrees; and it consists in the novel construction and combination of the parts hereinafter fully described and claimed.

In the drawings, Figure 1 is a plan view of the whiffletree from above, partly in section. Fig. 2 is an end view of the same, also partly in section.

A is the whiffletree, provided with the concave recess $a$ in each end.

B B are two rods pivoted by the pin $b$ to the middle of the whiffletree and having their ends secured into the plate $b'$.

C is a hook provided with a shank $c$, which slides in a hole B' in plate $b'$, and C' is a guide-plate provided with holes $c'$ and secured to the end of shank $c$. The holes $c'$ are larger than the rods B, over which they slide, so that the hook may have a certain amount of free play in every direction.

D is a tubular spring of india-rubber surrounding the shank $c$ and interposed between the plates C' and $b'$ for the purpose of receiving all the pulling strain.

E E are the hooks at the ends of the whiffletree for the attachment of the singletrees, each hook being provided with an inwardly-projecting end $e$, so that the singletree-loop cannot become disengaged from the hook when hanging loose. Each hook E has a screw-threaded shank E' and an end $e'$ of smaller diameter beyond the screw-threaded portion of the shank.

G G are loops secured to the ends of the whiffletree by the rivets or bolts $g$. Each loop is provided with a hole $g'$ for the shank of the hook to pass through and a longitudinal slot $h$ for the end $e'$ to work in.

H is a tubular spring of india-rubber surrounding the shank of the hook and protected from injury by the concave recess and the outer part of the loop.

I is a nut engaging with the screw-threaded shank and prevented from turning by the end of the whiffletree and the loop.

I' is a washer between the nut and the india-rubber spring. The india-rubber springs receive all the pulling strain, and are preferable to metallic springs, which become rusty and break. The longitudinal slot $h$ permits the hook to have side play, but prevents it from being moved too far in either direction. When the shoulder of the hook is held close against the loop by the spring and the singletree is hanging loose, there is not room for the loop of the singletree to pass between the end $e'$ and the loop G.

What I claim is—

1. The combination, with a whiffletree provided with a concave recess at its end, of a loop secured to the end of the whiffletree and provided with a hole and a longitudinal slot, a hook provided with a screw-threaded shank passing through said hole and an end working in said slot and permitting the said hook to have a limited horizontal movement, a tubular spring of india-rubber encircling said shank between the said concave recess and the outside of the loop, and a nut on the screw-threaded spindle between the said loop and the whiffletree end, and thereby prevented from turning, substantially as and for the purpose set forth.

2. The combination, with a whiffletree, of a loop secured to the end of the whiffletree and provided with a hole and a longitudinal slot, a hook provided with an inwardly-projecting end $e$ for retaining the loop of the singletree, a screw-threaded shank passing through said hole and an end working in said slot, a tubular spring encircling said shank, and a nut on the screw-threaded spindle, whereby the oscillations of the hook are limited by the said slot and the singletree cannot become detached from the hook while the spring holds the said projecting end near the loop, substantially as set forth.

In testimony whereof I affix my signature in presence of two witnesses.

ALBERT J. PARKHURST.

Witnesses:
 JAMES S. TOZER,
 WARREN G. HASTINGS.